April 11, 1950

D. W. MOORE, JR
FILM-TYPE RESISTOR AND METHOD
OF MANUFACTURING THE SAME
Original Filed Dec. 8, 1944

Re. 23,219

*INVENTOR.*
DAVID W. MOORE JR.
BY Mueller, Dodds & Mason

ATTORNEYS

Reissued Apr. 11, 1950

Re. 23,219

UNITED STATES PATENT OFFICE 23,219

FILM-TYPE RESISTOR AND METHOD OF MANUFACTURING THE SAME

David W. Moore, Jr., Los Angeles, Calif., assignor to Fairchild Camera and Instrument Corporation, a corporation of Delaware Original No. 2,438,250, dated March 23, 1948, Serial No. 567,220, December 8, 1944. Application for reissue March 18, 1949, Serial No. 82,257

15 Claims. (Cl. 201—60)

Figure 2:
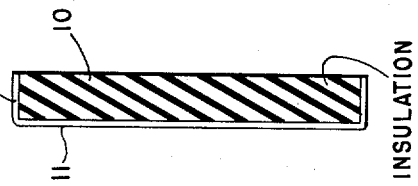

Matter enclosed in heavy brackets [ ] appears in the original patent but forms no part of this reissue specification; matter printed in italics indicates the additions made by reissue

This invention relates to film-type resistors and the method of manufacturing the same and particularly to such resistors of the high-resistance type having an accurately predetermined displacement-resistance characteristic and suitable for use as a variable resistor.

In electrical control systems, there are frequently required adjustable resistors of extremely high-resistance value and having accurately predetermined displacement-resistance characteristics. It is well known that the ordinary wire-wound resistor does not have a high enough resistance value for many of such applications and even where it is adequate the wire becomes so fine that it is quickly worn by the adjustable contact. Therefore, resort is frequently had to a variable-pressure granular-type resistor but the displacement-resistance characteristic of such resistors cannot be accurately predetermined and tends to be unstable and erratic in operation.

While certain film-type adjustable resistors have heretofore been proposed, it is necessary in such resistors to provide a structure in which the adjustable contact does not bear on the film, which would be quickly worn away. Certain of the prior art resistors of this general type have proposed to use a plurality of collecting conductors extending into a body or layer of high-resistance material, the portions of the conductors extending beyond the resistance body being adapted to be contacted directly or indirectly by a wiping contact. However, this latter type of resistor structure, in general, has been complicated and not suitable for mass production and has been difficult to construct with various accurately predetermined displacement-resistance characteristics, that is with various tapers.

It is an object of the invention, therefore, to provide a new and improved film-type resistor which avoids one or more of the above mentioned disadvantages and limitations of the structures of the prior art.

It is another object of the invention to provide a new and improved film-type resistor having one or more of the following advantages: an accurately predetermined displacement-resistance characteristic of any desired form; a stable and reproducible operating characteristic; long-service life; and a construction which is simple and suitable for mass production.

It is a further object of the invention to provide a new and improved method of manufacturing a resistor of the type described.

In accordance with the invention, a resistor having a predetermined resistance-displacement characteristic comprises [an elongated form, a plurality of open-circuit parallel] *a form having an extended lineal dimension, a plurality of open circuit adjacent* conductors secured to a surface of the form and including aligned exposed portions adapted to be wiped by an adjustable contact, and a thin deposited *solely metallic* high-resistance film formed directly on, bonded to, and bridging the conductors and having a tapered configuration correlated to the predetermined characteristic.

Further in accordance with the invention, the method of manufacturing a resistor of the type described comprises securing a plurality of open circuit [parallel] *adjacent* conductors to a surface of a form with aligned portions exposed and adapted to be wiped by adjustable contacts, and depositing and bonding a thin *solely metallic* high-resistance film directly on the conductors with a tapered configuration correlated to the predetermined characteristic.

By the term "deposited film" as used herein and in the appended claims is meant a film formed by [painting or spraying a resistance-material-containing solution or by] sputtering, plating or precipitating a metallic film on the collector conductors to form a non-self-supporting film bonded to the conductors, in contradistinction to a self-supporting mass of resistance material in which collecting conductors are embedded. *By the term "thin solely metallic high-resistance film," as used herein and in the appended claims, is meant a film in which the high resistance is determined primarily by the thinness of the film rather than by the specific resistance of the material of which the film is composed.* By the term "open-circuit conductors" as used herein and in the appended claims is meant a series of conductors in which the circuits between adjacent conductors are opened, as by removing portions of a continuous winding, or in which the conductors comprise elongated, insulated, conductive bars or segments. *By the term "tapered configuration," as used herein and in the appended claims, is meant a configuration giving any desired "taper" to the resistance-displacement characteristic, including a linear characteristic.*

For a better understanding of the invention, together with other and further objects thereof, reference is had to the following description taken in connection with the accompanying drawings while its scope will be pointed out in the appended claims.

Figure 1:
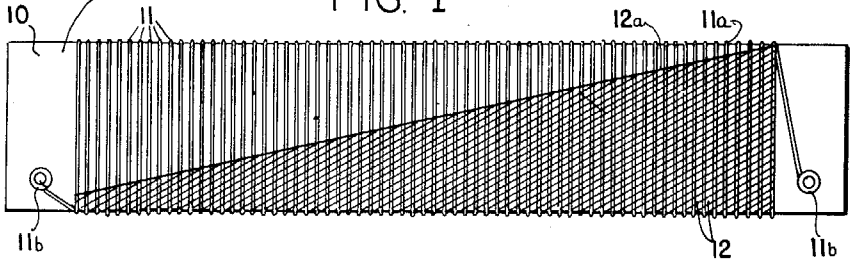
Figure 3:
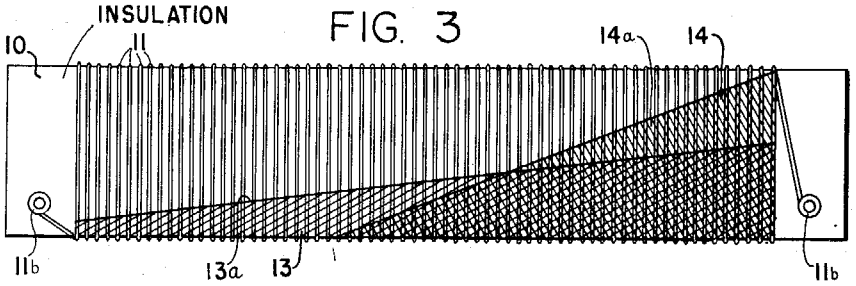
Figure 4:
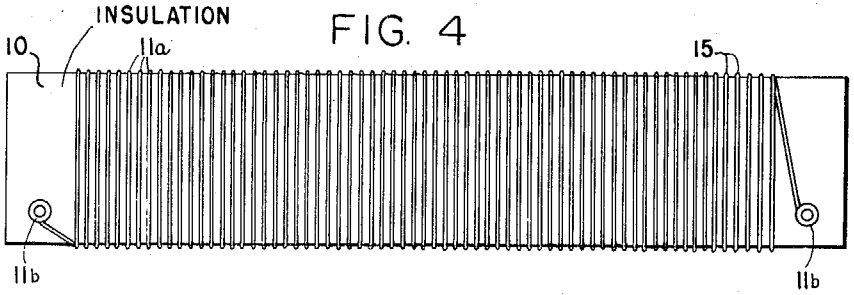

Referring now to the drawings, Fig. 1 is a view in elevation and Fig. 2 is an enlarged cross-sectional view of a resistor embodying the invention; Fig. 3 is a view in elevation of a modified form of the invention including two overlapping high-resistance films; while Fig. 4 is a view in elevation of the resistor of Fig. 1 in an intermediate phase of manufacture.

Referring now to Figs. 1 and 2 of the drawings, there is represented a resistor embodying the invention and having a predetermined resistance-displacement characteristic. The resistor comprises *a form having an extended lineal dimension such as* an elongated rectangular form 10, preferably of Bakelite or similar thermosetting plastic insulation material. Disposed on the form 10 are a plurality or series of open circuit *adjacent* parallel conductors 11 extending completely across the front surface and the top and bottom edge surfaces of the form 10, as shown in Fig. 2. The conductors 11 are cemented or otherwise secured to the surfaces of the form 10 and are insulated from each other, as by utilizing an insulating cement for securing them to the form 10. The portions 11*a* of the conductors 11 extending over the upper edge of the form comprise aligned exposed portions of the conductors which are to be adapted to be wiped by an adjustable contact. While the conductors 11 are illustrated as substantially spaced for clarity, in practice they may be [closed] *closely* spaced, providing a more nearly continuous resistance-displacement characteristic.

The resistor of Figs. 1 and 2 also comprises a thin deposited high-resistance film 12 formed directly on, bonded to, and bridging the conductors 11 and having a tapered configuration 12*a* correlated to the desired predetermined resistance-displacement characteristic. The film 12 may be [of colloidal graphite, such as that commercially available under the trade name "Aquadag" or] an extremely thin film, such as monatomic film, of a metal, the noble metals being particularly suitable for this purpose because of their resistance to corrosion. If the desired resistance-displacement characteristic of the resistor is expressed by the relation $R=f(x)$, the configuration of the film is expressed by the relation $$y=\frac{k/d[f(x)]}{dx}$$

In case a resistance-displacement characteristic is desired which is complicated in configuration or involves extreme rates of change, the single film of Fig. 1 may be replaced by two or more overlapping thin deposited high-resistance films, represented by the films 13 and 14 of Fig. 3. In this instance, the films 13 and 14 preferably have different specific resistances and different configurations 13a and 14a, respectively, which are jointly correlated to the desired predetermined resistance-displacement characteristic.

While the resistor described may be manufactured by any of a number of methods, in a preferred method the form 10 is an elongated plate-like form and a single continuous conductor 15 is wound on the form as shown in Fig. 4. The portions of the conductor on one principal surface of the form, for example, the front surface as represented in Fig. 4, and on at least one edge surface thereof, preferably on both edge surfaces, are cemented or otherwise secured to the form. The portions of the conductor 15 on another surface of the form, preferably the back surface as represented in Fig. 4, are then removed by shearing, grinding or the like to form the plurality of

*adjacent* parallel open-circuit conductors, while the portions of the continuous conductor 15 on one of the edge surfaces, for example, the upper edge surface, are cleaned on their upper faces to constitute aligned exposed portions of the parallel conductors adapted to be wiped by an adjustable contact.

After the formation of the parallel open-circuit conductors on the form 10 as shown in Fig. 4 and described above, the front surfaces of the conductors are cleaned of any insulating cement and there is deposited directly on the conductors a thin *solely metallic* high-resistance film or a plurality of overlapping film of different specific resistances, the configuration of the film or films being correlated to the desired predetermined resistance-displacement characteristics, as described above. Such film or films as represented in Figs. 1 and 3 may be deposited directly on the conductor by [spraying or precipitating the film, in case of the use of colloidal graphite or the like. In case of the use of a metallic film, it may be deposited by] sputtering, plating, or by photographic sensitization of a normally non-conductive composition film *to form a solely metallic high-resistance film.*

In any case, the desired configuration may be obtained by first plotting the relationship $$y=\frac{k/d[f(x)]}{dx}$$

on a stiff paper or like template, cutting the template along the curve and utilizing it as a mask to cover the portion of the resistor conductors which are not to be coated. The resistor with a template in place is then subjected to any of the various processes described for depositing the high-resistance film thereon.

It will be apparent that the resistor constructed as described above may be used in any conventional electrical control system, either as an adjustable resistor or as a voltage divider, by suitably mounting a resistor in such position that the upper edge portions of the conductors 11 may be wiped by an adjustable electrical contact.

The resistor of the invention manufactured as described has the advantages that it is extremely simple in construction and readily adapted to mass production; that its resistance-displacement characteristic is stable and accurately reproducible in operation; and that the adjustable contact is made on the collector conductors which may be of suitable rigidity and dimensions to withstand wear and provide a long-service life. At the same time, any desired resistance-displacement characteristic within extremely wide limits and including extremely high rates-of-change of resistance may be readily provided, particularly by the use of multiple films as represented in Fig. 3. Further, the resistor of the invention is particularly effective in dissipating heat in that it has a maximum ratio of heat-dissipating surface to heat-generating volume.

While there have been described what are at present considered to be the preferred embodiments of the invention, it will be apparent to those skilled in the art that various changes and modifications may be made therein without departing from the spirit or scope of the invention.

What is claimed as new is:

1. A resistor having a predetermined resistance-displacement characteristic comprising, an elongated form, a plurality of open circuit parallel conductors secured to a surface of said form and including aligned exposed portions adapted to be wiped by an adjustable contact, and a thin deposited *solely metallic* high-resistance film formed directly on, bonded to, and bridging said conductors and having a tapered configuration correlated to said predetermined characteristic.

2. A resistor having a predetermined resistance-displacement characteristic comprising, an elongated rectangular form, a plurality of open circuit parallel conductors extending completely across and secured to a surface of said form and including aligned exposed portions adapted to be wiped by an adjustable contact, and a thin deposited *solely metallic* high-resistance film formed directly on, bonded to, and bridging said conductors and having a tapered configuration correlated to said predetermined characteristic.

3. A resistor having a predetermined resistance-displacement characteristic comprising, [an elongated form, a plurality of open circuit parallel] *a form having an extending lineal dimension, a plurality of open circuit adjacent* conductors cemented to a surface of said form and insulated from each other and including aligned exposed portions adapted to be wiped by an adjustable contact, and a thin deposited *solely metallic* high-resistance film formed directly on, bonded to, and bridging said conductors and having a tapered configuration correlated to said predetermined characteristic.

4. A resistor having a predetermined resistance-displacement characteristic comprising, an elongated form, a plurality of open circuit parallel conductors secured to a surface of said form and extending over an edge thereof, the extended portions of said conductors being exposed and being adapted to be wiped by an adjustable contact, and a thin deposited *solely metallic* high-resistance film formed directly on, bonded to, and bridging said conductors and having a tapered configuration correlated to said predetermined characteristic.

[5. A resistor having a predetermined resistance-displacement characteristic comprising, an elongated form, a plurality of open circuit parallel conductors secured to a surface of said form and including aligned exposed portions adapted to be wiped by an adjustable contact, and a thin deposited high-resistance film of colloidal graphite formed directly on, bonded to, and bridging said conductors and having a tapered configuration correlated to said predetermined characteristic.]

[6. A resistor having a predetermined resistance-displacement characteristic comprising, an elongated form, a plurality of open circuit parallel conductors secured to a surface of said form and including aligned exposed portions adapted to be wiped by an adjustable contact, and a thin deposited high-resistance film of metal formed directly on, bonded to, and bridging said conductors and having a tapered configuration correlated to said predetermined characteristic.]

7. A resistor having a predetermind resistance-displacement characteristic comprising, [an elongated form, a plurality of open circuit parallel] *a form having an extended lineal dimension, a plurality of open circuit adjacent* conductors secured to a surface of said form and including aligned exposed portions adapted to be wiped by an adjustable contact, and a thin deposited high-resistance film of noble metal formed directly on, bonded to, and bridging said conductors and having a tapered configuration correlated to said predetermined characteristic.

8. A resistor having a predetermined resistance-displacement characteristic expressed by the relation $R=f(x)$ comprising, [an elongated form, a plurality of open circuit parallel] *a form having an extended lineal dimension, a plurality of open circuit adjacent* conductors secured to a surface of said form and including aligned exposed portions adapted to be wiped by an adjustable contact, and a thin deposited *solely metallic* high-resistance film formed directly on, bonded to, and bridging said conductors and having a tapered configuration expressed by the relation $$y=\frac{k/d[f(x)]}{dx}$$

9. A resistor having a predetermined resistance-displacement characteristic comprising, [an elongated form, a plurality of open circuit parallel] *a form having an extended lineal dimension, a plurality of open circuit adjacent* conductors secured to a surface of said form and including aligned exposed portions adapted to be wiped by an adjustable contact, and a plurality of overlapping thin deposited *solely metallic* high-resistance films formed directly on, bonded to, and bridging said conductors, said films having different specific resistances and different tapered configurations correlated to said predetermined characteristic.

10. The method of manufacturing a resistor having a predetermined resistance-displacement characteristic and formed on [an elongated form] *a form having an extended lineal dimension* which comprises, securing a plurality of open circuit [parallel] *adjacent* conductors to a surface of said form with aligned portions exposed and adapted to be wiped by an adjustable contact, and depositing and bonding a thin *solely metallic* high-resistance film directly on and bridging said conductors in a tapered configuration correlated to said predetermined characteristic.

11. The method of manufacturing a resistor having a predetermined resistance-displacement characteristic and formed on an elongated plate-like form which comprises, winding a conductor on said form, securing to said form the portions of said conductor on a principal surface of said form and on at least one edge surface thereof, removing the portions of said conductor on another surface of said form, the portions of said conductor on said edge surface being exposed and adapted to be wiped by an adjustable contact, and depositing and bonding a thin *solely metallic* high-resistance film directly on and bridging said conductors in a tapered configuration correlated to said predetermined characteristic.

12. The method of manufacturing a resistor having a predetermined resistance-displacement characteristic and formed on [an elongated form] *a form having an extended lineal dimension* which comprises, cementing a plurality of open circuit [parallel] *adjacent* conductors to a surface of said form insulated from each other and with aligned portions exposed and adapted to be wiped by an adjustable contact, and depositing and bonding a thin *solely metallic* high-resistance film directly on and bridging said conductors in a tapered configuration correlated to said predetermined characteristic.

13. The method of manufacturing a resistor having a predetermined resistance-displacement characteristic and formed on [an elongated form] *a form having an extended lineal dimension* which comprises, securing a plurality of open circuit [parallel] *adjacent* conductors to a surface of said form with aligned portions exposed and adapted to be wiped by an adjustable contact, and spraying a thin *solely metallic* high-resistance film directly on and bridging said conductors in a tapered configuration correlated to said predetermined characteristic.

14. The method of manufacturing a resistor having a predetermined resistance-displacement characteristic and formed on [an elongated form] *a form having an extended lineal dimension* which comprises, securing a plurality of open circuit [parallel] *adjacent* conductors to a surface of said form with aligned portions exposed and adapted to be wiped by an adjustable contact, and precipitating a thin *solely metallic* high-resistance film directly on and bridging said conductors in a tapered configuration correlated to said predetermined characteristic.

15. The method of manufacturing a resistor having a predetermined resistance-displacement characteristic and formed on [an elongated form] *a form having an extended lineal dimension* which comprises, securing a plurality of open circuit [parallel] *adjacent* conductors to a surface of said form with aligned portions exposed and adapted to be wiped by an adjustable contact, and sputtering a thin *solely metallic* high-resistance metallic film directly on and bridging said conductors in a tapered configuration correlated to said predetermined characteristic.

16. The method of manufacturing a resistor having a predetermined resistance-displacement characteristic and formed on [an elongated form] *a form having an extended lineal dimension* which comprises, securing a plurality of open circuit [parallel] *adjacent* conductors to a surface of said form with aligned portions exposed and adapted to be wiped by an adjustable contact, and depositing and bonding directly on and bridging said conductors a plurality of overlapping thin *solely metallic* high-resistance films of different specific resistances and of different tapered configurations correlated to said predetermined characteristic.

17. A resistor having a predetermined resistance-displacement characteristic comprising, [an elongated form,] *a form having an extended lineal dimension,* a plurality of open circuit [parallel] *adjacent* conductors secured to a surface of said form and including aligned exposed portions adapted to be wiped by an adjustable contact, and a thin deposited *solely metallic* high-resistance film formed directly on, bonded to, and bridging said conductors and having a tapered configuration correlated to said predetermined characteristic.

DAVID W. MOORE, JR.

REFERENCES CITED

The following references are of record in the file of this patent and the original patent:

UNITED STATES PATENTS

| Number | Name | Date |
|---|---|---|
| 1,649,990 | Smith | Nov. 22, 1927 |
| 1,987,118 | Lodge | Jan. 8, 1935 |
| 2,021,661 | Kisfaludy | Nov. 19, 1935 |
| 2,023,603 | Lodge | Dec. 10, 1935 |
| 2,058,525 | Takanashi | Oct. 27, 1936 |
| 2,081,572 | Bagno | May 25, 1937 |
| 2,121,983 | Richter | June 28, 1938 |
| 2,195,531 | Gaut et al. | Apr. 2, 1940 |

FOREIGN PATENTS

| Number | Country | Date |
|---|---|---|
| 225,137 | Great Britain | Nov. 27, 1924 |
| 495,473 | Great Britain | Feb. 11, 1937 |